US011313952B2

(12) United States Patent
Ellgas et al.

(10) Patent No.: US 11,313,952 B2
(45) Date of Patent: Apr. 26, 2022

(54) SENSOR HOUSING WITH PARTICLE BLOCKING FEATURE

(71) Applicant: Waymo LLC, Mountain View, CA (US)

(72) Inventors: Simon Ellgas, San Jose, CA (US); Justin Matthew Andrade, San Jose, CA (US); Bryce Remesch, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 560 days.

(21) Appl. No.: 16/222,120

(22) Filed: Dec. 17, 2018

(65) Prior Publication Data

US 2020/0191918 A1 Jun. 18, 2020

(51) Int. Cl.
| | | |
|---|---|---|
| G01S 7/481 | (2006.01) | |
| G03B 17/08 | (2021.01) | |
| G01S 13/931 | (2020.01) | |
| G01S 17/931 | (2020.01) | |
| G02B 27/00 | (2006.01) | |
| G03B 17/56 | (2021.01) | |
| G01S 7/02 | (2006.01) | |

(52) U.S. Cl.
CPC ........ G01S 7/4813 (2013.01); G02B 27/0006 (2013.01); G03B 17/08 (2013.01); G03B 17/561 (2013.01); *G01S 7/027* (2021.05); *G01S 13/931* (2013.01); *G01S 17/931* (2020.01)

(58) Field of Classification Search
CPC ........... G01S 7/4813; G01S 2007/4977; G02B 27/0006; H04N 5/2171; G01N 21/15; B60S 1/56
See application file for complete search history.

(56) References Cited

U.S. PATENT DOCUMENTS

| | | | |
|---|---|---|---|
| 4,674,788 A | 6/1987 | Ohmura et al. | |
| 6,273,488 B1* | 8/2001 | Pike ...................... | B05D 5/083 296/91 |
| 2007/0217782 A1 | 9/2007 | McCutchen et al. | |
| 2012/0162428 A1 | 6/2012 | Wee | |
| 2017/0115480 A1* | 4/2017 | Wada ..................... | G03B 15/02 |
| 2017/0297540 A1 | 10/2017 | Zhang et al. | |
| 2018/0017680 A1 | 1/2018 | Pennecot et al. | |
| 2018/0037267 A1 | 2/2018 | Williams et al. | |
| 2020/0088480 A1* | 3/2020 | Hu .......................... | G01S 17/86 |

FOREIGN PATENT DOCUMENTS

| | | |
|---|---|---|
| CN | 206894757 U | 1/2018 |
| KR | 20180102460 A | 9/2018 |

OTHER PUBLICATIONS

International Search Report and Written Opinion for Application No. PCT/US2019/065434 dated Apr. 9, 2020.

\* cited by examiner

*Primary Examiner* — Noam Reisner
(74) *Attorney, Agent, or Firm* — Botos Churchill IP Law

(57) ABSTRACT

This technology relates to a system for preventing particle buildup on a sensor housing. The system may include a sensor housing including a first surface, a motor, and a spoiler edge. The motor may be configured to rotate the sensor housing around an axis. The spoiler edge may be positioned adjacent to the first surface and extended away from the first surface perpendicular to the axis of rotation of the sensor housing.

23 Claims, 9 Drawing Sheets

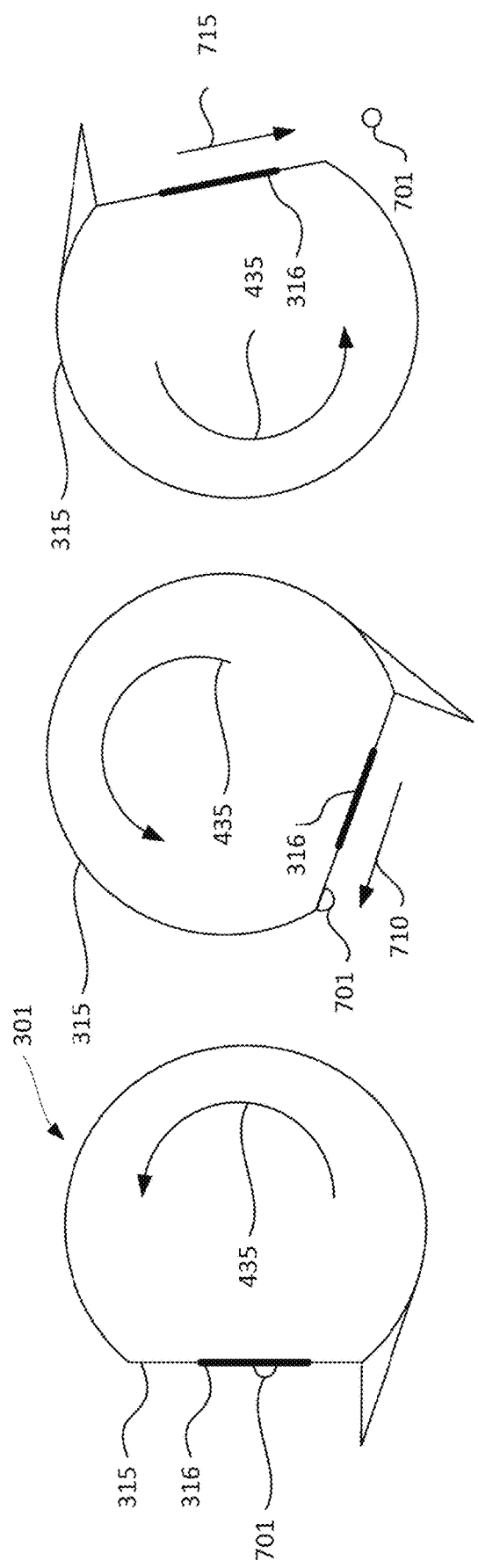

SENSOR HOUSING WITH PARTICLE BLOCKING FEATURE

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, condensation, etc., which can cause a buildup of debris and contaminants on these sensors. Typically, the sensors include a cover to protect the internal sensor components of the sensors from the debris and contaminants, but over time, the cover itself may become dirty. As such, the functions of the internal sensor components may be impeded as signals transmitted and received by the internal sensor components are blocked by the debris and contaminants.

SUMMARY

Aspects of the disclosure are directed to a system for preventing particle buildup on a sensor housing. The system may comprise a sensor housing including a first surface; a motor, wherein the motor is configured to rotate the sensor housing around an axis; and a spoiler edge, wherein the spoiler edge is positioned adjacent to the first surface and extended away from the first surface perpendicular to the axis of rotation of the sensor housing.

In some instances, the first surface may be coated in a hydrophobic coating.

In some instances, the position adjacent to the first surface may be a leading position relative to the first surface during rotation of the sensor housing.

In some instances, the spoiler edge may be configured to generate an airflow substantially parallel to the first surface. In some examples, the airflow may be configured to alter a trajectory of a particle. In some examples, the airflow may be configured to alter trajectories' of particles having different sizes by different amounts. In some examples, the airflow may be configured to alter a trajectory of a first particle by a first amount and a trajectory of a second particle by a second amount, wherein the second particle is smaller than the first particle and the second amount is greater than the first amount.

In some instances, the sensor housing may be configured to generate a centripetal force on one or more particles in contact with the sensor housing. In some examples, the centripetal force is generated by the motor rotating the sensor housing around the axis of rotation.

In some instances, the spoiler edge may be configured to cast a shadow region on the sensor housing.

In some instances, the spoiler edge may be configured to cast a shadow region on the first surface.

In some instances, the first surface may be substantially flat.

In some instances, the first surface may include a housing window.

In some instances, the system may further include a vehicle, wherein the sensor is mounted to the vehicle.

Additional aspects of the disclosure may be directed to a system for preventing particle buildup on a sensor housing. The system may comprise a sensor including a sensor housing; a housing window integrated into the sensor housing; and a spoiler edge, wherein the spoiler edge is positioned adjacent to the housing window and extended away from the housing window perpendicular to an axis of rotation of the sensor.

In some instances, the system may further comprise a motor configured to rotate the sensor around the axis of rotation.

In some instances, the spoiler edge may be configured to cast a shadow region on the housing window.

In some instances, the spoiler edge may be configured to generate an airflow substantially parallel to the housing window.

In some instances, the sensor may be mounted to a vehicle. In some examples, the system may further comprise the vehicle.

BRIEF DESCRIPTION OF THE DRAWINGS

The present technology is illustrated by way of example, and not by way of limitation, in the figures of the accompanying drawings in which like reference numerals refer to similar elements including:

FIGS. 7A-7C are example illustrations of a particle being ejected from a sensor housing in accordance with aspects of the disclosure.

DETAILED DESCRIPTION

This technology relates to preventing the buildup of particles on one or more portions of a sensor housing to assure adequate operation. For instance, a sensor may include a housing to protect the internal sensor components from particles of water, dust, dirt, etc., as well as other contaminants, such as insects. However, the housing itself may become covered by particles over time. As such, the functions of the internal sensor components may be impeded as signals transmitted and received by the internal sensor components may be blocked by the buildup of particles. To address this, a spoiler edge may be incorporated into or attached to the sensor housing. The spoiler edge may alter the path of the particles to prevent the particles from building up on areas of the sensor housing where signals may be transmitted and/or received.

Figure 1:
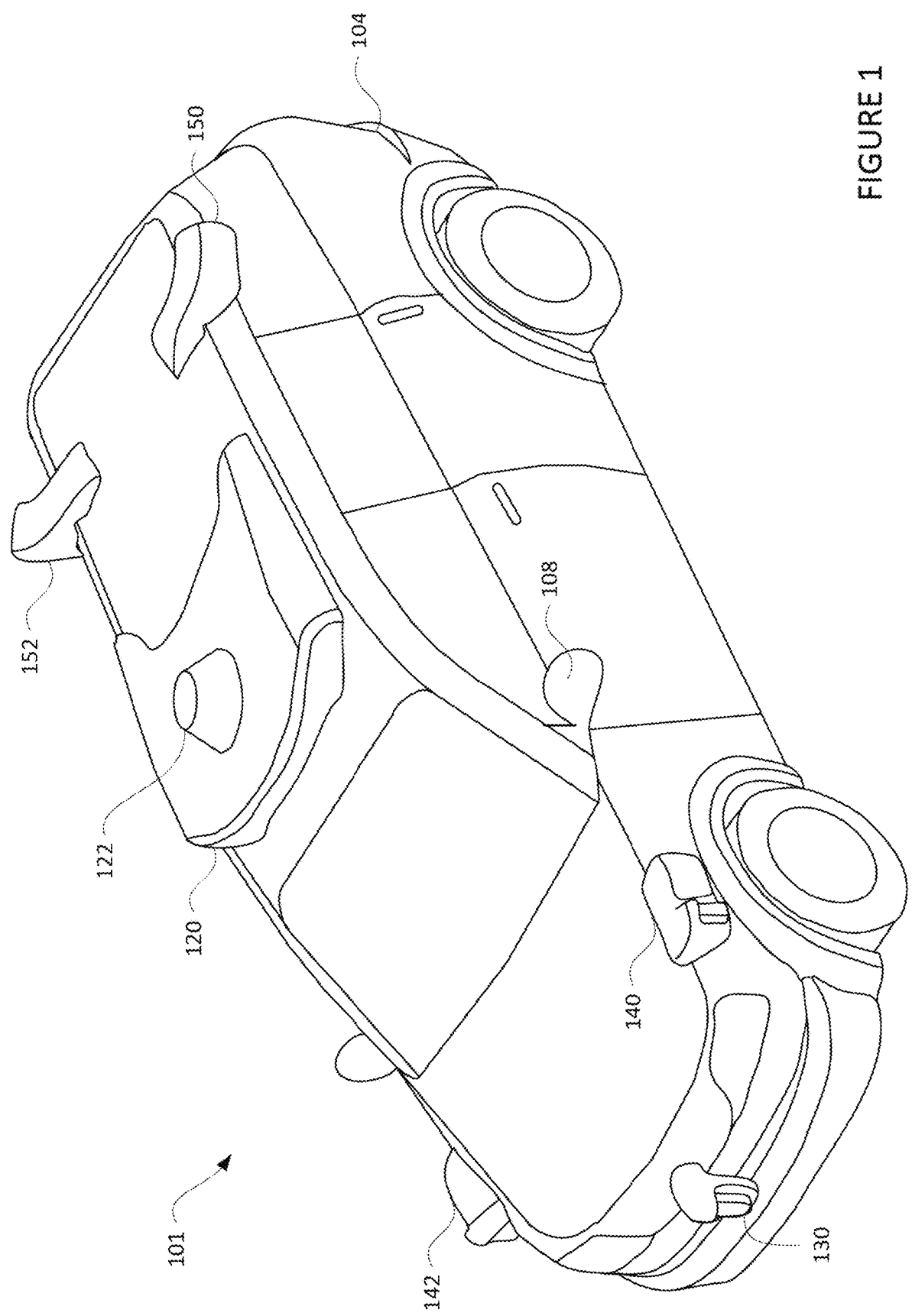
FIG. 1 is an example of sensor housing attached to a vehicle in accordance with aspects of the disclosure.

A vehicle may have one or more sensors to detect objects external to the vehicle such as other vehicles, obstacles in the roadway, traffic signals, signs, trees, etc. For example, the vehicle 101, as shown in FIG. 1, may include lasers, sonar, radar, cameras and/or any other detection devices that capture images and record data which may be processed by computing devices within the vehicle. The vehicle's sensors, such as LIDAR, radar, cameras, sonar, or other such imaging sensors, may capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to objects when needed.

The sensors may be arranged around the vehicle's exterior or interior. For example, housings 130, 140, 142, 150, 152 may include, for example, one or more LIDAR devices. The sensors may also be incorporated into the typical vehicle components, such as tail lights/turn signal lights 104 and/or side view mirrors 108. In some instances one or more laser, radar, sonar, camera and/or other such imaging sensors may be mounted on the roof, such as housings 122 and 120.

Figure 2:
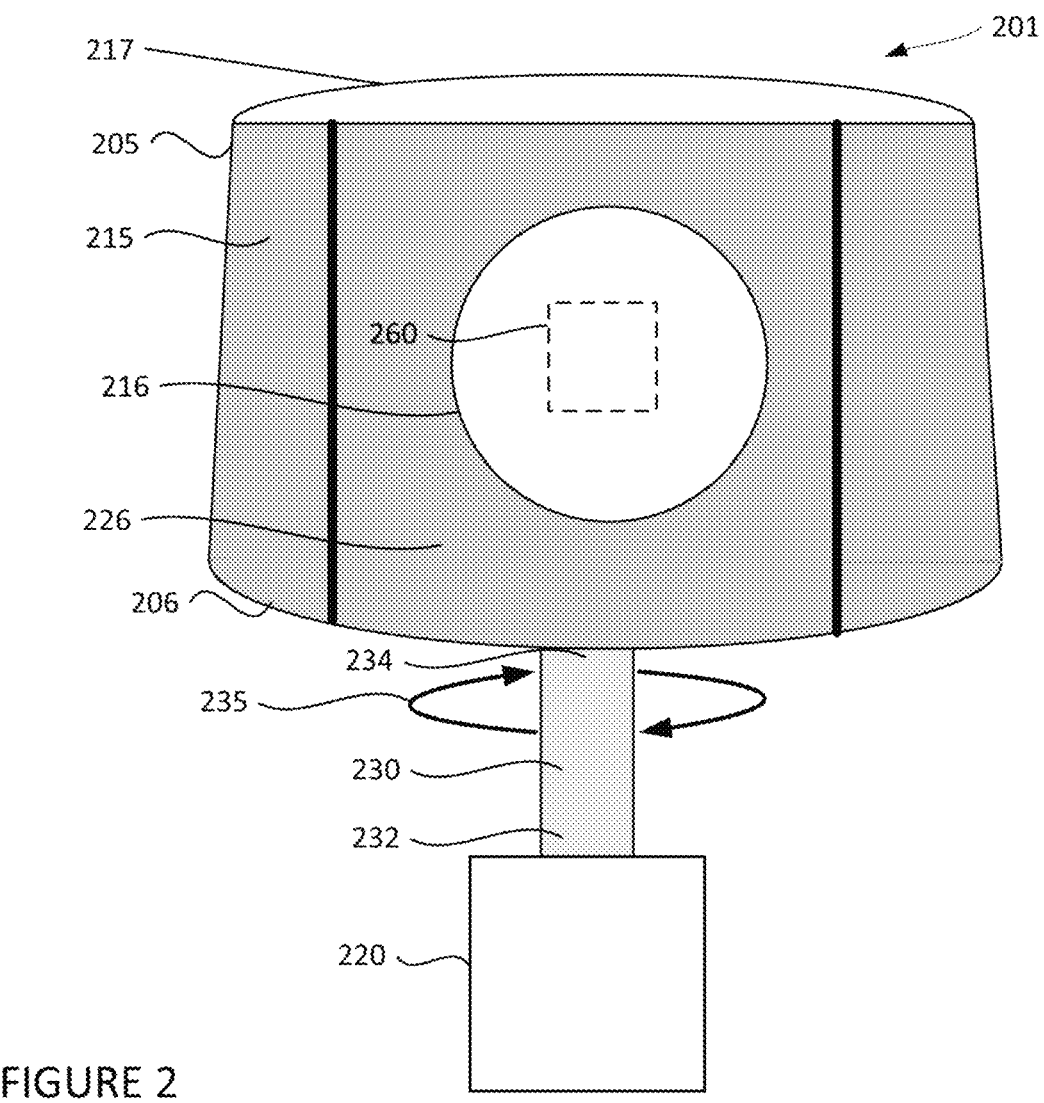
FIG. 2 is an example sensor connected to a motor in accordance with aspects of the disclosure.

A vehicle sensor may be comprised of internal sensor components and a housing for housing the internal sensor components. For instance, the sensor housing 215, which may be compared to housing 122, 130, 140, 142, 150, and 152, may be configured such that it has a domed shaped top portion 217 with a side wall 205, such that the housing is in the shape of a frustum, as shown in FIG. 2. Although the sensor housing is shown in the shape of a frustum, the sensor housing may be configured in various shapes and sizes, such as spheres, cylinders, cuboids, cones, prisms, pyramids, cubes, etc., or any combination of such shapes. The sensor housing 215 may be comprised of materials such as plastic, glass, polycarbonate, polystyrene, acrylic, polyester, etc.

The sensor housing may include a surface, such as a housing window constructed at a certain location on the sensor housing such that the internal sensor components may transmit and receive one or more signals through the housing window. For instance, the side wall 205 of the sensor housing 215 may include a flat portion 226 in which housing window 216 is incorporated to allow signals (not shown) from internal sensor components 260 to penetrate the sensor housing 215, as further shown in FIG. 2. Although the housing window 216 is shown as being circular in FIG. 2, various other shapes may also be used for the housing window. In addition, the housing window may be incorporated onto non-flat surfaces of the housing. In other words, the housing window may not be flat, but may be substantially flat and/or curved.

In some instances the entire sensor housing 215, or a large portion of the sensor housing 215, may be penetrable by the signals transmitted and received by the internal sensor components, thereby allowing a large portion or the entire sensor housing 215 to function as a housing window. As such, although the housing window 216 is shown as being only a portion of the sidewall 205, in some instances the entire sidewall 205 may be constructed as a housing window. Further, multiple housing windows may be positioned on the sensor housing 215. The housing window 216 may be composed of the same, or different, material as the sensor housing 215.

The sensor 201 and/or sensor housing 215 may be attached to a motor via a sensor shaft. For instance, as further shown in FIG. 2, the sensor shaft 230 may include a first end 232 and a second end 234. The first end of the of a sensor shaft 232 may be attached to a sensor motor 220 and the second end of the sensor shaft 234 may be connected to the sensor 201 and/or sensor housing 215, such as at the base 206 of the sensor housing 215. In this regard, the first end of the sensor shaft 232 may be attached to the motor 220 via a belt, gear, chain, friction roller, etc. The motor 220 may rotate the sensor shaft 230 in a direction 235 causing the entire sensor 201 and/or sensor housing 215 to also rotate in a direction 235. In some embodiments the sensor shaft 230 may only rotate the sensor housing 215, and not the internal sensor components 260 of the sensor. The sensor 201, sensor housing 215, and/or motor 220 may each be located internally or externally from a vehicle.

Figure 3:
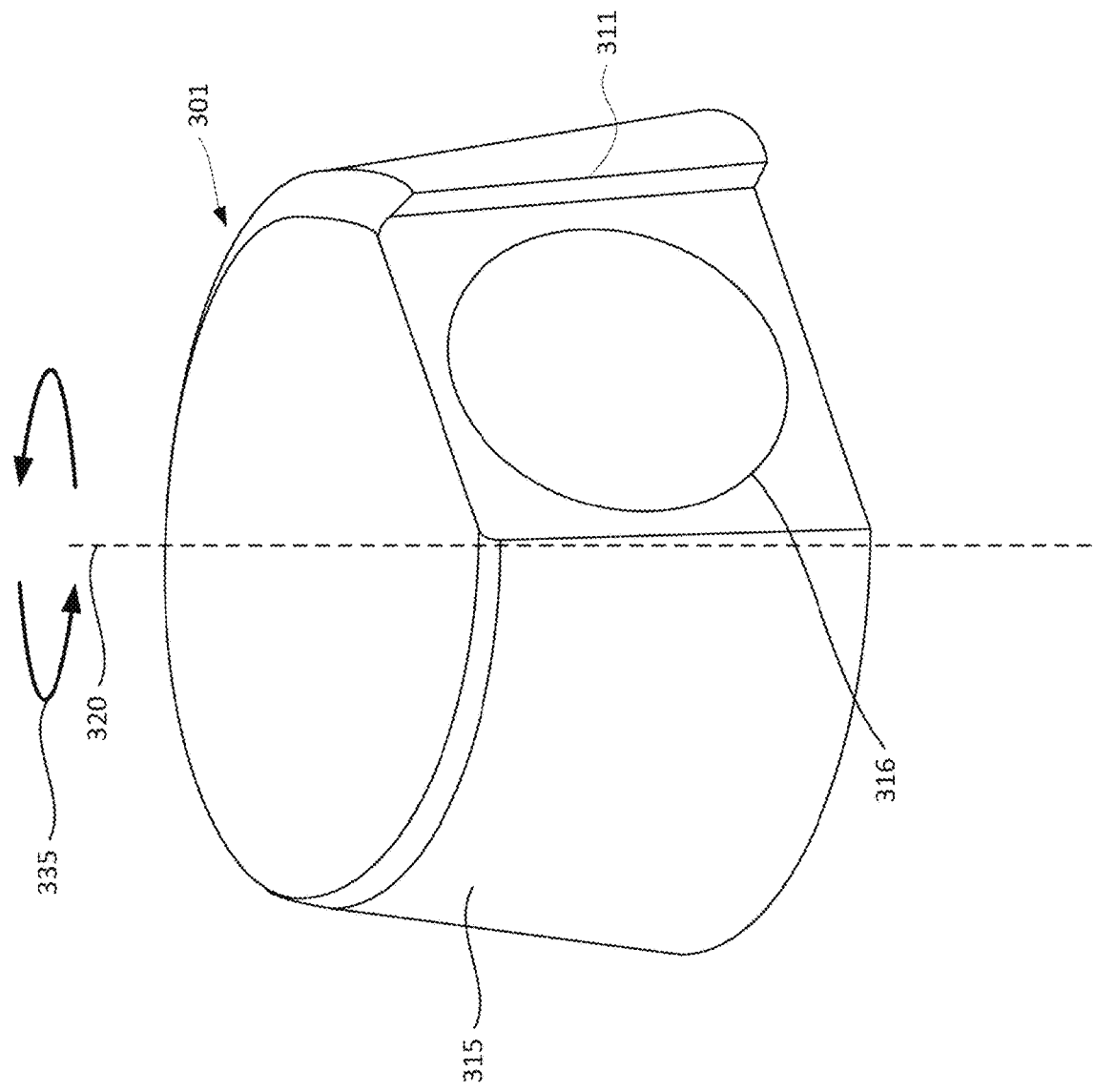
FIG. 3 is an example sensor having a spoiler edge in accordance with aspects of the disclosure.

A spoiler edge may be incorporated into or attached to the sensor housing. In this regard, the spoiler edge may be positioned adjacent to the housing window and configured such that the spoiler edge extends away from the housing window and/or sensor housing. For example, a spoiler edge 311 may be positioned adjacent to the housing window 316 of a sensor housing 315 for a sensor 301 (which may be compared to sensor 201), as shown in FIG. 3. In this regard, the spoiler edge 311 may be positioned such that the spoiler edge 311 is at a leading position relative to the housing window 316 during rotation in a first direction 335. The spoiler edge 311 may be extended away from the housing window 316 and/or the sensor housing 315 in a direction perpendicular to the axis of rotation 320 of the sensor 301. The spoiler edge 311 may be extended away, or be otherwise elevated, from the housing window 316 and/or the sensor housing 315 by a percentage of the diameter of the sensor housing 315. For instance, the height of the spoiler edge 311 may be between 5%-100% of the sensor housing diameter.

The spoiler edge 311 may be the same or a different material than the sensor housing 315 and/or housing window 316. The spoiler edge 311 may be glued, welded, or otherwise attached to the sensor housing 315. In some instances, the spoiler edge 311 may be an integrated part of the sensor housing 315 and/or housing window 316.

Figure 4A:
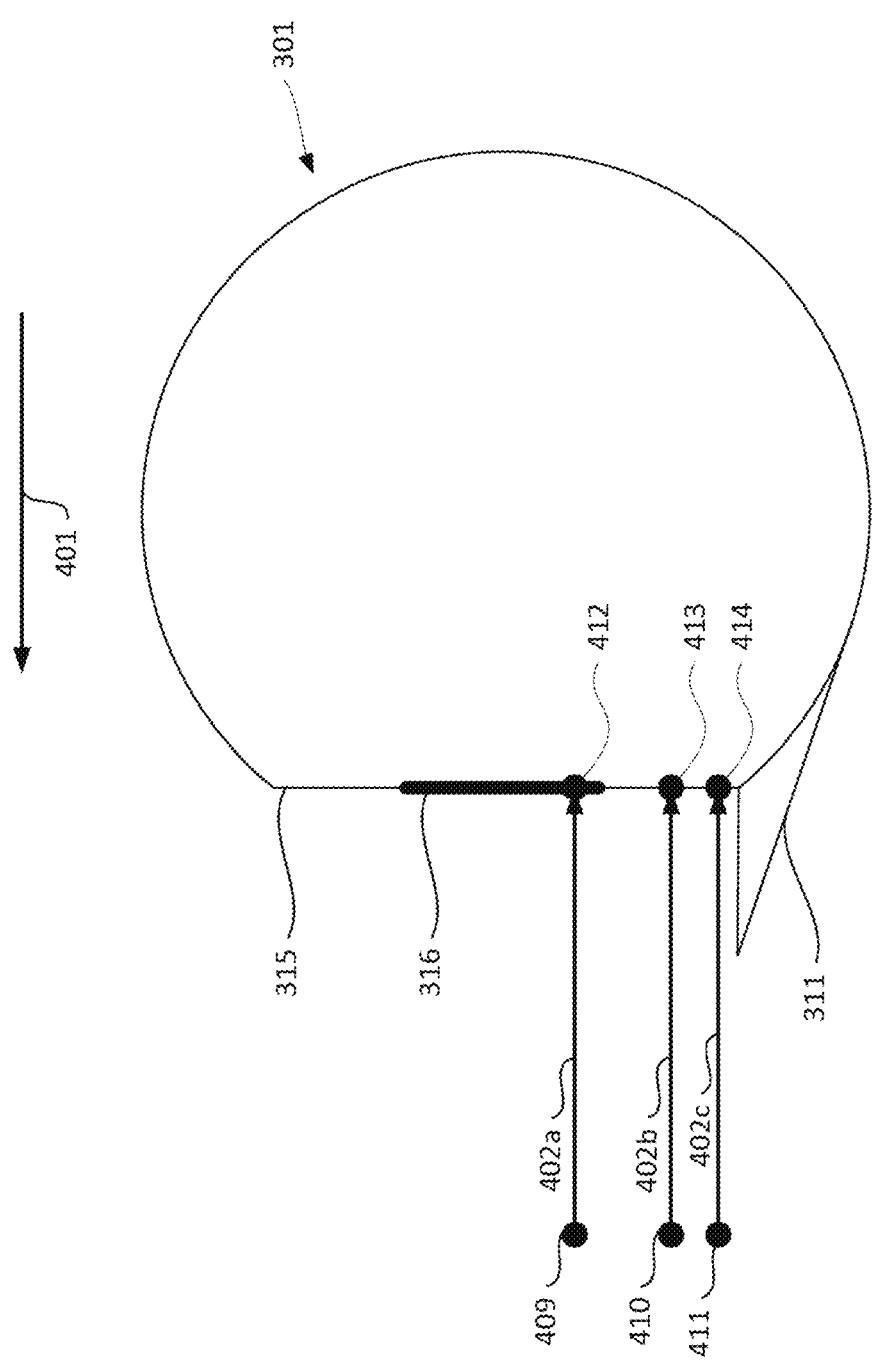
FIG. 4A is an example illustration of particle trajectories towards a stationary sensor in accordance with aspects of the disclosure.

Particles, such as dust, dirt, water, snow, ice, etc., may be traveling (i.e., in the air or environment) on trajectories towards the sensor housing, particularly in instances where the sensor is in motion. For example, FIG. 4A illustrates a top down view of sensor 301 mounted or otherwise attached to a vehicle, such as vehicle 101 (not shown). As the vehicle 101 moves in a first direction illustrated by arrow 401, the sensor 301 may also move in the first direction. The movement of the sensor 301 in the direction of arrow 401 may result in particles in the vicinity of the sensor 301, such as particles 409, 410 and 411 having trajectories 402a, 402b, and 402c respectively, directed towards the sensor 301 in a second direction illustrated by the arrows on the trajectories. Although FIG. 4A illustrates the second direction as being opposite the first direction, the second direction may be any direction relative to the first direction such that the particles are directed towards the sensor housing and/or housing window 316.

In the event the sensor housing 315 is not rotating relative to the vehicle, such as shown in FIG. 4A, the particles 409-411 may continue along their respective trajectories 402a-402c towards the sensor housing 315 with little, if any interference from the sensor housing 315 and/or spoiler edge 311. For instance, the particles 419-411 may continue along their respective trajectories 402a-402c and contact the housing window and sensor housing at locations 412, 413, and 414, respectively. As such, the particles 409, 410, and 411 may potentially interfere with the operation of the sensor 301.

Figure 4B:
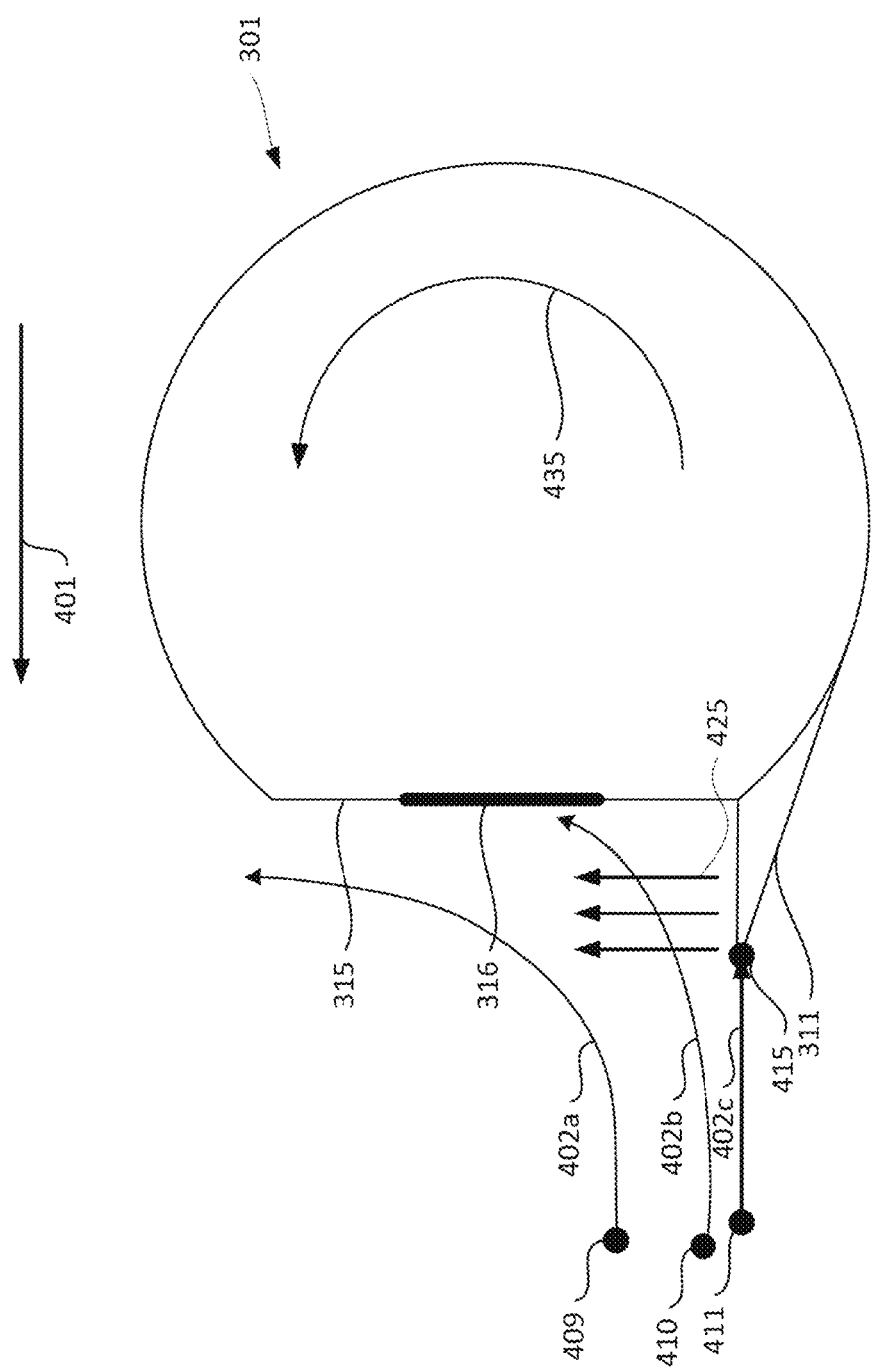
FIG. 4B is an example illustration of particle trajectories towards a rotating sensor in accordance with aspects of the disclosure.

The spoiler edge may alter the path of particles as they approach the sensor housing. In this regard, the rotation of the spoiler edge 311 and sensor housing 315 in a direction 435 may generate an airflow 425 that travels parallel, or nearly parallel, to the sensor housing 315 and housing window 316 and away from the spoiler edge 311, as shown in FIG. 4B. Upon the particles 409 and 410 coming into this airflow 425, the particles are subjected to the airflow 425 and their respective trajectories 402a and 402b may be altered, as further shown in FIG. 4B. Particle 411, traveling along trajectory 402c may be physically blocked by the spoiler edge 311 at impact point 415. As such, some, or all of the particles may be directed away from the sensor housing 315 and/or housing window 316 and/or block by the spoiler edge.

Figure 5A:
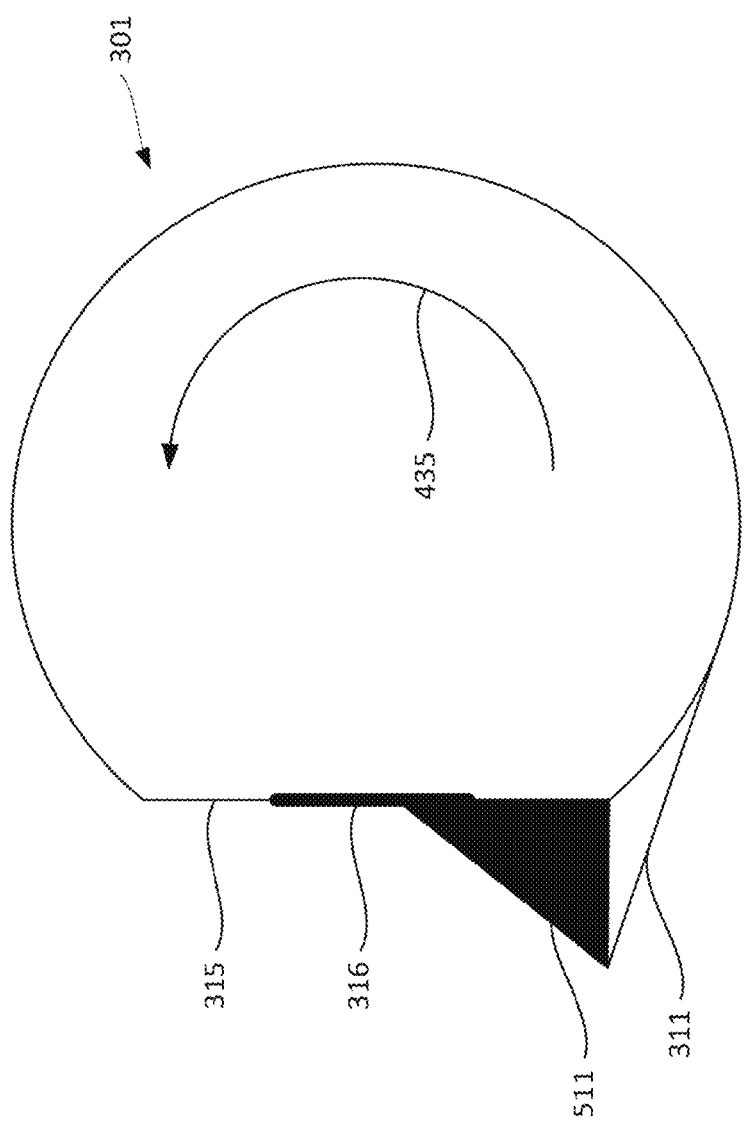
FIGS. 5A and 5B illustrate example shadow regions generated by spoiler edges of different heights in accordance with aspects of the disclosure.

During rotation of the sensor housing, the spoiler edge may cast a "shadow region" having a certain length on the sensor housing. In this shadow region, particles may not be able to contact the sensor housing. For instance, as shown in FIG. 5A, the spoiler edge 311 and sensor housing 315 may rotate in direction 435. The rotation of the spoiler edge 311 may cause the spoiler edge 311 to cast a shadow region 511 on the sensor housing 315 and housing window 316. In other words, the shadow region 511 may be formed by the rotation of the spoiler edge 311 blocking all particles which have a trajectory which would result in the particles contacting a portion of the sensor housing 315 and/or housing window 316 within the shadow region 511.

Figure 5B:
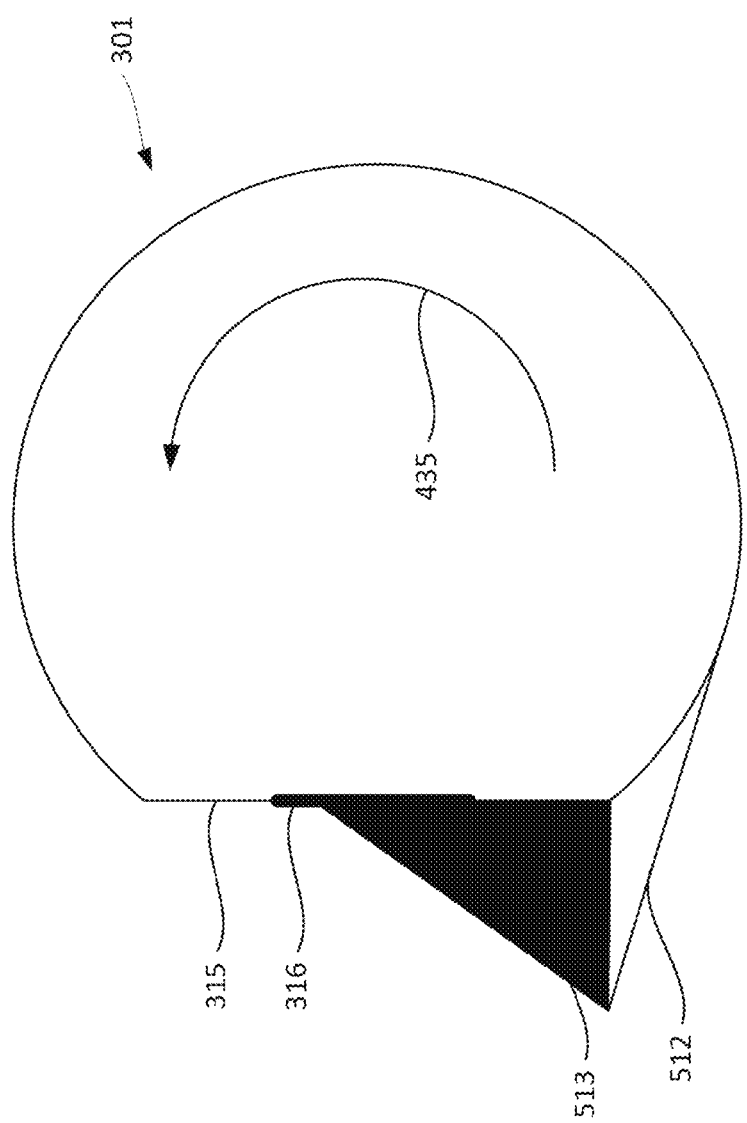

The size of the shadow region may be adjusted by altering various characteristics such as the spoiler's height, the rotation speed of the spoiler edge, and/or the speed at which the particles approach the sensor housing. Each of these characteristics may be dependent on the speed the vehicle or other object on which the sensor is mounted. In this regard, the faster the particles (e.g. droplets of water) approach the sensor housing, the smaller the shadow region. Of course, the shadow region may be increased by increasing the speed of the rotation of the spoiler edge and/or the height of the spoiler edge (i.e., distance away from the housing window and perpendicular to the axis of rotation). For example, FIG. 5B shows the shadow region 513 formed by a spoiler edge 512 having an increased height relative to the spoiler edge 311 of FIG. 5A. As such, the shadow region 513 cast by spoiler edge 512 covers a greater area of the sensor housing 315 and housing window 316 than spoiler edge 311.

Figure 6:
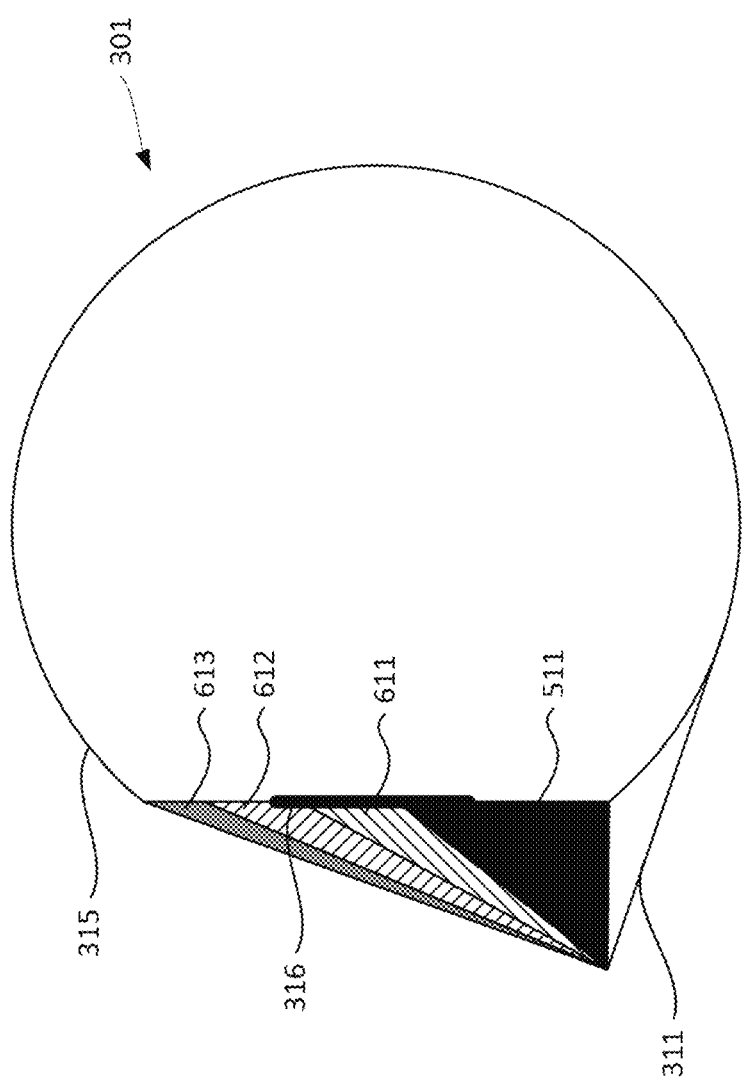
FIG. 6 illustrates example regions where particles of different sizes may contact the sensor housing in accordance with aspects of the disclosure.

Particles which are not blocked from contacting the sensor housing may have their path altered by the airflow generated by the rotation of the sensor housing and/or spoiler edge. The amount of alternation to the particles' paths may be based upon the size of the respective particle. In this regard, smaller, lighter particles may be subjected to greater path alteration by the airflow generated by the spoiler edge, such as airflow 425, as compared to the path alteration of larger, heavier particles. As such, larger particles may contact the sensor housing closer to the spoiler edge than smaller particles. For example, the trajectories of larger particles may be offset only slightly by the airflow 425, thereby allowing the larger particles to contact the sensor housing 315 and/or housing window 316 in region 611, which is close to the shadow region 511 generated by the spoiler edge 311, as shown in FIG. 6. The trajectories of smaller particles may be more offset by the airflow 425, such that the smaller particles contact the sensor housing 315 and/or housing window 316 in region 612, which is outside of the both the shadow region 511 and region 611. The trajectories of even smaller particles may be offset such that these smaller particles contact the sensor housing 315 and/or housing window 316 in region 613, which is outside of the both the shadow region 511, region 611, and region 612. The trajectories of the smallest particles may be offset such that they do not contact the sensor housing 315 or housing window 316.

Particles which do contact the sensor housing may be ejected from the sensor housing and/or moved away from the housing window via the centripetal force generated by rotating the sensor housing. In this regard, a particle's adhesion force may be approximately proportional to the particle's contact area with the sensor housing. The contact area may be proportional to the square of the particle's diameter. Centripetal force, however, may be proportional to the particle's mass, which may grow as a cubic function of the particle's diameter. Thus, the centripetal force may grow faster with growing particle diameter than the adhesion force of the particle. Accordingly, larger particles which may contact the sensor housing or housing window are subjected to a centripetal force greater than their adhesion force and can be ejected from the sensor housing and/or moved away from the housing window by rotating the sensor housing. In some instances, a hydrophobic coating may also be applied to the sensor housing in order to reduce the particles adhesion force and thereby reduce the amount of centripetal force to remove and/or move the particle.

Turning to the example of FIG. 7A, a particle 701 may contact the housing window 316 of sensor 301. Rotation of the sensor housing 315 in direction 435 may generate a centripetal force on the particle 701. The centripetal force may cause the particle 701 to move across the sensor housing 315 in a direction illustrated by arrow 710, away from the housing window 316, as illustrated in FIG. 7B. Continued centripetal force may cause the particle 701 to be ejected from the sensor housing 315 in a particular direction, as illustrated by arrow 715. Accordingly, the particle 701 is eliminated from the sensor housing 315 by a centripetal force generated from the rotation of the sensor 301.

The features described herein may allow for continued use of a sensor even when the sensor is operated in situations where the sensor housing is subject to particles such as water, dust, dirt, etc. By doing such, the sensor may continue operation without interruption or the need for an individual to manually clean the sensor, as the spoiler edge may prevent particles from building up on the sensor housing and/or housing window. As such, the vehicle may continually operate in environments which produce a lot of such particles, such as outdoors in the rain, in the snow, at construction sites, at off-road locations, etc. Thus, the features described herein may eliminate the need for a wiper to wipe debris and/or contaminants from the sensor's housing, resulting in fewer moving parts to clear the sensor housing and the risk of scratches being introduced from a wiper dragging debris across the sensor housing. Additionally, the features described may clear the sensor without generating wiping noise, such as generated by a wiper blade rubbing on a sensor housing.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A sensor housing for preventing particle buildup on a housing window, the sensor housing comprising:
 a first surface in which the housing window is incorporated, wherein the housing window is configured to allow signals that are transmitted and received by one or more sensor components within the sensor housing to penetrate the sensor housing; and
 a spoiler edge positioned adjacent to the housing window and extended away from the first surface in a direction perpendicular to an axis of rotation of the sensor housing, the spoiler edge being configured to generate an airflow when the spoiler edge is at a leading position relative to the housing window as the sensor housing is rotated around the axis, the airflow causing trajectories of particles heading toward the housing window to be altered in order to prevent the signals from being blocked, and causing particles coming in contact with the housing window to move away via a centripetal force generated by the rotation of the sensor housing around the axis.

2. The sensor housing of claim 1, wherein the first surface is coated with a hydrophobic coating in order to reduce an adhesion force of the particles with the first surface.

3. The sensor housing of claim 1, wherein a height of the spoiler edge is equal to a percentage of a diameter of the sensor housing.

4. The sensor housing of claim 3, wherein the percentage of the diameter of the sensor housing is between 5% and 100%.

5. The sensor housing of claim 1, wherein the airflow generated by the spoiler edge is substantially parallel to the first surface during the rotation of the sensor housing.

6. The sensor housing of claim 1, wherein the centripetal force is proportional to a particle's mass, which can grow as a cubic function of the particle's diameter.

7. The sensor housing of claim 1, wherein the particles have different sizes.

8. The sensor housing of claim 7, wherein the airflow is configured to alter a trajectory of a first particle by a first amount and a trajectory of a second particle by a second amount, and
 wherein the second particle is smaller than the first particle and the second amount is greater than the first amount.

9. The sensor housing of claim 1, wherein the centripetal force causes particles coming in contact with the sensor housing to be ejected from the sensor housing.

10. The sensor housing of claim 9, wherein the centripetal force is generated by a motor rotating the sensor housing around the axis of rotation.

11. The sensor housing of claim 1, wherein the spoiler edge is configured to cast a shadow region on the sensor housing.

12. The sensor housing of claim 1, wherein the spoiler edge is configured to cast a shadow region on the first surface.

13. The sensor housing of claim 1, wherein the first surface is substantially flat.

14. The sensor housing of claim 1, wherein the airflow generated by the spoiler edge prevents the particles from building up on the sensor window.

15. The sensor housing of claim 1, wherein the sensor housing is configured to be mounted on a vehicle.

16. A sensor housing for preventing particle buildup on a housing window, the sensor housing comprising:
 a first surface in which the housing window is incorporated to allow signals to be transmitted and received therethrough; and
 a spoiler edge positioned adjacent to the housing window and extended away from the first surface in a direction perpendicular to an axis of rotation of the sensor housing, the spoiler edge being configured to generate an airflow when the spoiler edge is at a leading position relative to the housing window as the sensor housing is rotated around the axis, the airflow causing trajectories of particles heading toward the housing window to be altered in order to prevent the signals from being blocked, and causing particles adhering to the housing window to be ejected via a centripetal force generated by the rotation of the sensor housing around the axis.

17. The sensor housing of claim 16, wherein the first surface is coated with a hydrophobic coating in order to reduce an adhesion force of the particles with the first surface.

18. The sensor housing of claim 16, wherein the spoiler edge is configured to cast a shadow region on the housing window.

19. The sensor housing of claim 16, wherein the airflow generated by the spoiler edge is substantially parallel to the housing window during the rotation of the sensor housing.

20. The sensor housing of claim 16, wherein the sensor housing is configured to be mounted on a vehicle.

21. The sensor housing of claim 16, wherein the airflow generated by the spoiler edge prevents the particles from building up on the sensor window.

22. The sensor housing of claim 16, wherein a height of the spoiler edge is equal to a percentage of a diameter of the sensor housing.

23. The sensor housing of claim 22, wherein the percentage of the diameter of the sensor housing is between 5% and 100%.

* * * * *